Figure 1:
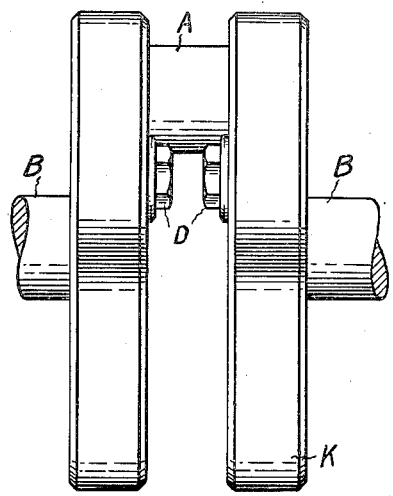

Dec. 18, 1934.   P. BELYAVIN   1,984,454

BUILT-UP CRANKSHAFT FOR RECIPROCATING ENGINES

Filed Dec. 21, 1933

Inventor
P. Belyavin
By
J. Edw Maybee
Atty

Patented Dec. 18, 1934

1,984,454

UNITED STATES PATENT OFFICE 1,984,454

BUILT-UP CRANKSHAFT FOR RECIPROCATING ENGINES

Paul Belyavin, London, England

Application December 21, 1933, Serial No. 703,423
In Great Britain December 29, 1932

6 Claims. (Cl. 74—598)

This invention relates to built-up crank-shafts, and has for its chief object an improved construction of the built-up crankshaft, whereby the crank pins and the journal pins can be either tightly gripped in the webs, or completely released for removal when necessary, by the simple action of tightening or releasing wedges, and/or screws or bolts provided for that purpose.

In most of the designs of built-up crank-shafts known at present, the crank pins and the journals are shrunk into the corresponding holes in the webs, so that to change any of the crank pins or journals in case they are damaged, the web must be split. In another frequently used design, the crank pins and journals have conical ends which are fitted into corresponding holes in the webs, and are tightened by screws. This latter design has the disadvantage of bulkiness, and what is even more inconvenient, due to the smallness of the angle of taper on the conical ends, a small error in diameter makes a big difference to the length of the crankshaft, making this type particularly unsuitable for multi-cylinder engines.

In another and less well known type of built-up crankshaft, the outside part of the web around the crank pin is split, and a tightening bolt is fitted across the slot, so that the end of the crank pin may be gripped by tightening the bolt in the split end of the web and so deforming the web at its periphery. This design suffers from weakening the web at the split portion.

In order to have the crank pins and journals easily detachable, to obtain an absolutely rigid construction when assembled, and to obtain much greater gripping power on both crank pins and journals, I propose according to my invention to make the outer part of the web rigid, and the inner portion around the crank pin and journal flexible by providing suitably arranged slots between the two said portions of the web, and wedges and/or screws or bolts when the latter are tightened into their slots, which force thus expands the slots and compresses the inner, flexible portions of the web against the crank pins and journals without deformation of the web at its periphery and so grips the said crank pins and journals tightly and makes the whole construction rigid. Conversely, the slackening of the wedges and/or screws or bolts permits the crank pins and journals to be removed at will.

This type of crankshaft can also be used as an adjustable base crankshaft or axle for locomotives, etc.

Another particular advantage of this type of crankshaft is its suitability for the use of ball or roller bearings.

In order that the said invention may be clearly understood and readily carried into effect, the same will now be more fully described with reference to the accompanying drawing.

Figure 3:
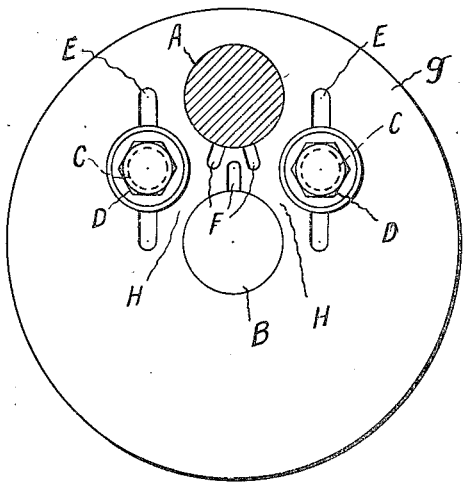
Figure 2:
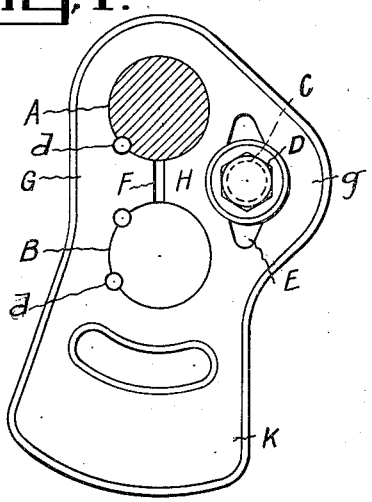
Figure 4:
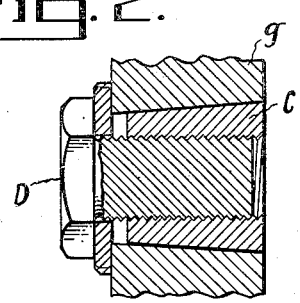

Fig. 1 is a side elevation of a built-up crank constructed in accordance with my invention;

Fig. 2 a front elevation of the same;

Fig. 3 a similar view of a modification;

Fig. 4 a cross sectional detail of a wedge; and

Figure 5:
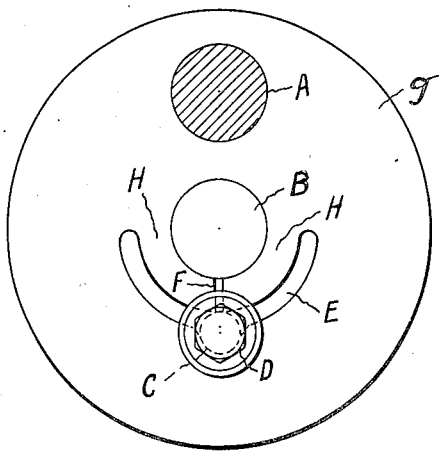

Fig. 5 a front elevation of a modification of the forms shown in Figs. 2 and 3.

In the drawing like numerals of reference indicate corresponding parts in the different figures.

Figs. 1 and 2 represent a balanced crank shaft of the type described. A is the crank pin, B is the journal, C the wedge of the type shown in Fig. 4, D is the tightening screw, E is the slot provided to make the inner portion H of the web G flexible. The rigid outer portion $g$ of the web forms a triangular belt, with the crank pin, journal, and wedge each occupying one of its three corners; it is this triangular shape, in this instance, which makes the outer portion of the web rigid, though a sufficient thickness of metal would serve the purpose. The bridge between the crank pin and the journal is, in this case, cut right through, the slot being marked F. The balance weight is indicated by K. Dowel pins $d$ either plain or screwed, may be provided when necessary. All similar parts on the other sketches are indicated by the same letters.

Fig. 3 shows a construction which does not have the bridge between the crank pin and the journal cut right through, but has slots cut right through the thickness of the web in the manner indicated on the drawing, the said slots overlapping and extending alternately into the bridge from the pin opening to the shaft opening. These slots make the bridge compressible under the action of the wedges which are duplicated at opposite sides of the crank shaft. Such flexible action of the bridge can, of course, be provided in many other ways.

Fig. 5 shows an arrangement in which the slot E is arc-shaped and is on the opposite side of the journal B to the crank pin A. Conversely, of course, the position of the crank pin and journal might be reversed. In either case one only of the said parts is clamped by the action of the wedge and the other must be secured in any other known manner.

It is to be understood that many more combinations of slots, wedges, screws and bolts, are possible in built-up crankshafts of the type described, without departing from the principle of this invention.

What I claim as my invention is:

1. A crank shaft of the built-up type comprising a shaft; a crank pin; a web connecting the shaft and pin and having openings therein in which the shaft and crank pin are fitted, the bridge portion of the web between the shaft and pin being partly cut away to render it compressible along a line extending between the shaft and pin; and means parallel to the shaft and crank pin bearing against the bridge and a relatively rigid portion of the web for compressing the bridge.

2. A crank shaft according to claim 1 in which the bridge is formed with a slot extending between the openings for the pin and shaft to provide the specified compressibility.

3. A crank shaft according to claim 1 in which the bridge is formed with transverse slots extending alternately into the bridge from the pin opening and the crank opening to provide the specified compressibility, the said slots overlapping one another.

4. A crank shaft comprising a shaft; a crank pin; a web connecting the shaft and crank pin and having openings therein in which the shaft and crank pin are fitted and having a slot formed therein at one side of and substantially parallel to a line joining the centres of the pin and shaft; and wedging means fitted in said slot, the bridge portion of the web between the shaft and pin being slotted to permit said bridge portion to be compressed transversely to wedge it between the shaft and pin.

5. A crank shaft comprising a shaft; a crank pin; a web connecting the shaft and crank pin and having openings therein in which the shaft and crank pin are fitted and having a slot formed therein at each side of and substantially parallel to a line joining the centres of the pin and shaft; and wedging means fitted in said slots, the bridge portion of the web between the shaft and pin being slotted to permit said bridge portion to be compressed transversely to wedge it between the shaft and pin.

6. A crank shaft of the built-up type comprising a shaft; a crank pin; a web connecting the shaft and pin and having openings therein in which the shaft and crank pin are fitted, the said web being formed with a rigid portion and a relatively movable portion; and wedging means engaging said portions to wedge the relatively movable portion between the shaft and pin.

PAUL BELYAVIN.